(No Model.)
J. W. LEFEVRE & L. D. YOUNG, Jr.
BRAKE FOR THRASHING MACHINES.
No. 412,515. Patented Oct. 8, 1889.
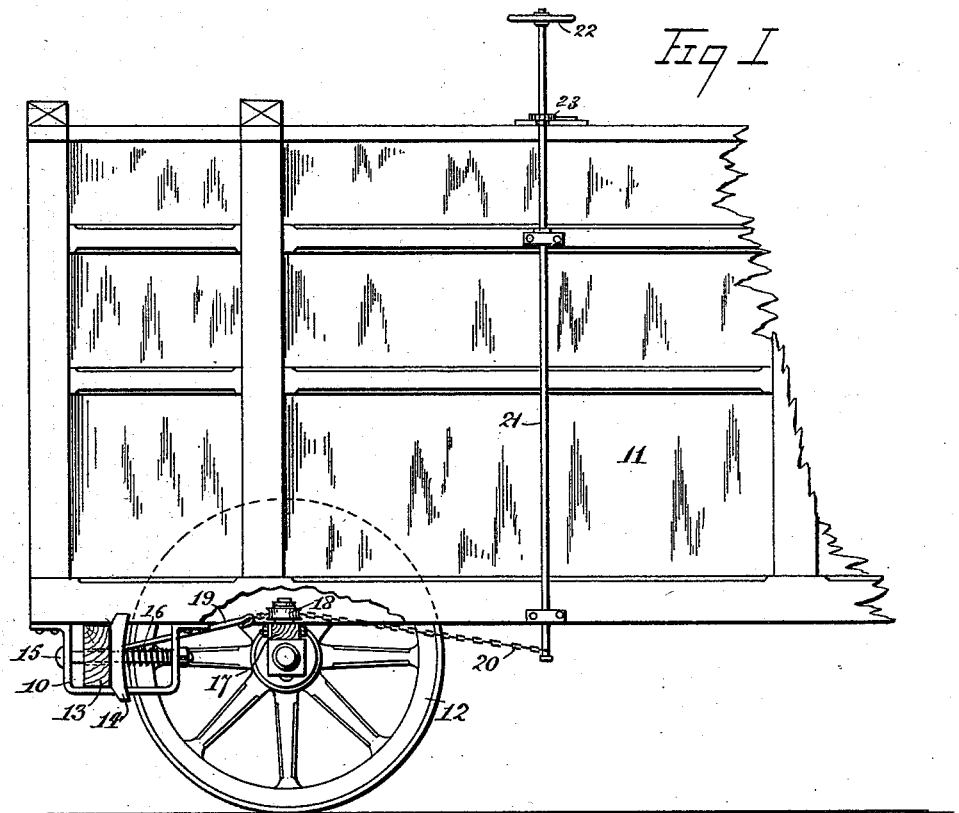
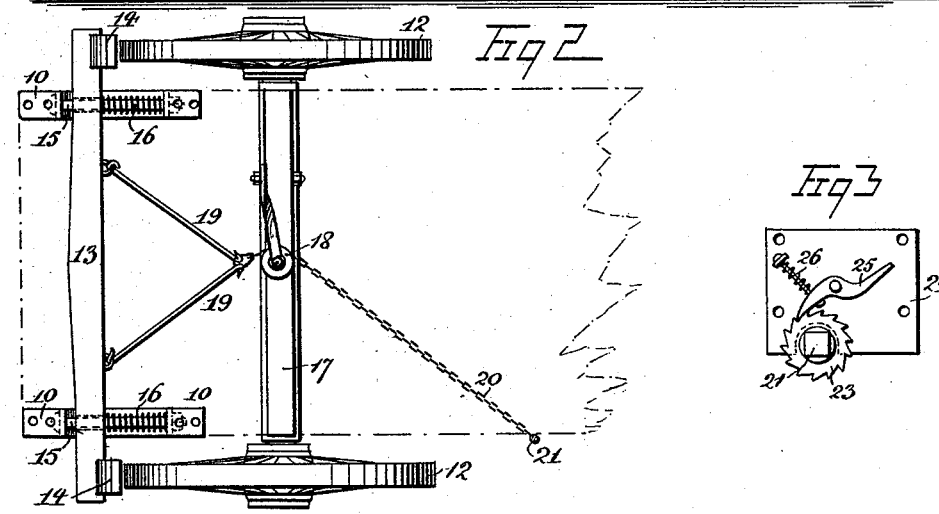
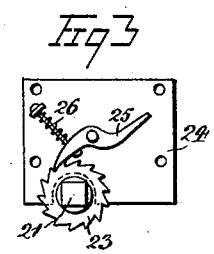
WITNESSES:
INVENTOR:
BY
ATTORNEYS.

UNITED STATES PATENT OFFICE.

JOHN W. LEFEVRE AND LORENZO D. YOUNG, JR., OF TOLEDO, IOWA.

BRAKE FOR THRASHING-MACHINES.

SPECIFICATION forming part of Letters Patent No. 412,515, dated October 8, 1889.

Application filed June 26, 1889. Serial No. 315,637. (No model.)

*To all whom it may concern:*

Be it known that we, JOHN W. LEFEVRE and LORENZO D. YOUNG, Jr., of Toledo, in the county of Tama and State of Iowa, have invented a new and Improved Brake for Thrashing-Machines, of which the following is a full, clear, and exact description.

Our invention relates to an improved brake especially adapted for application to thrashing-machines, and has for its object to provide a brake of simple and durable construction, whereby the wheels of the machine may be held firmly locked when the machine is in operation; and a further object of the invention is to provide a brake which may be quickly and effectively applied at any time and capable of manipulation from the top of the machine.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a side elevation of the thrashing-machine having the brake applied, the brake being in section and one wheel removed from the axle. Fig. 2 is a plan view of the attachment with the body of the machine removed, and Fig. 3 is a plan view of the brake-rod and the pawl and ratchet adapted for locking the rod.

In carrying out the invention a bracket 10, essentially U-shaped, is secured to the under portion of the thrashing-machine body 11—one at each side—at the rear of the hind carrying-wheels 12. The brackets are so attached to the body of the machine that the body-section thereof will be the under portion, as best shown in Fig. 1, and the said brackets are adapted to support a brake-beam 13 at or near its extremities, which brake-beam has attached to the forward side near each end a shoe 14, of any approved construction, adapted for contact with the periphery of the hind wheels 12. Through the vertical members of each of the brackets 10 a bolt 15 is passed, which bolts are likewise passed through the brake-beam 13, as best illustrated in Fig. 2, the said beam being capable of lateral movement upon the said bolts. The brake-shoes are normally kept out of contact with the hind wheels of the thrashing-machine through the medium of coiled springs 16, one spring being wound upon each of the bolts 15, bearing at one end against the forward member of the bracket 10, and at the other end against the forward face of the brake-beam 13. Upon the axle or a bar 17, clipped or otherwise secured to the axle at or near the center, a grooved pulley 18 is horizontally pivoted, and at each side of the center of the brake-beam, upon the forward side, a link 19 is pivoted, the two links being brought together at their forward extremities and united with one end of a chain 20, which chain is passed over the grooved pulley 18 to a connection with the lower end of a brake-rod 21, as shown in Fig. 1, which brake-rod is preferably rectangular in cross-section, except at its bearings, where it is circular, and carried perpendicularly upward from the bottom of the thrashing-machine above the top of the same. The upper end of the brake-rod is made to terminate in a hand-wheel 22, or equivalent device, and at or near the top of the thrashing-machine a ratchet-wheel 23 is firmly secured to the said brake-bar. A plate 24 is ordinarily rigidly attached to the top of the thrashing-machine in front of the brake-bar, and upon said plate a pawl 25 is pivoted capable of contact with the teeth of the ratchet-wheel 23, as shown in Fig. 3, which pawl is normally held in engagement with the ratchet-wheel by means of a spring 26. It will be observed that by revolving the brake-rod in one direction the chain will be wound upon the lower extremity thereof, and the brake-beam will be brought forward against the tension of the spring 16 until the brake-shoes 14 firmly contact with the wheels, the brake-rod being prevented from slipping back or slacking the chain 20 by reason of the contact of the pawl 25 with the ratchet-wheel 23. To release the brake, the pawl 25 is thrown out of contact with the ratchet-wheel 23, whereupon the springs 16, acting automatically, force the brake beam and shoes from the wheels by uncoiling the chain from the brake-rod.

Having thus described our invention, we claim as new and desire to secure by Letters Patent—

1. The combination, with the body of a vehicle, the axle 17, pulley 18, pivoted upon the axle, and the brackets 10, secured to the under side of the vehicle-body at each end, of a brake-beam 13, confined at each end in the brackets and sliding freely within the same, said brake-beam being provided at each end with the brake-shoes 14, the link-rods 19, secured to the brake-beam at suitable points and connected at their opposing ends, the chain 20, connected to the link-arms passing over the pulley 18, and a vertical brake-rod 21, journaled upon the side of the body and provided with a pawl-and-ratchet attachment, said brake-rod being connected at its lower end to the chain 20, substantially as shown and described.

2. The combination, with the body of a thrashing-machine, a brake-rod journaled upon one side of the same, provided with a pawl-and-ratchet attachment, brackets secured to the bottom—one near each side—at the rear of the axle of the machine, and a pulley pivoted upon the said axle, of a bolt passing through the brackets, a brake-beam provided with brake-shoes adapted for lateral movement in the bracket upon the said bolts, a spring coiled around each bolt, contacting with the bracket and the beam, links projected from the forward face of the brake-beam, and a chain secured to the said links at one end, passing over the said pulley and attached to the brake-rod at the other end, substantially as shown and described.

JOHN W. LEFEVRE.
LORENZO D. YOUNG, JR.

Witnesses:
E. E. RAMSDELL,
L. G. KINNE.